July 3, 1934.    R. JELINEK    1,964,879
PICTURE DISPLAY DEVICE
Filed Nov. 12, 1932
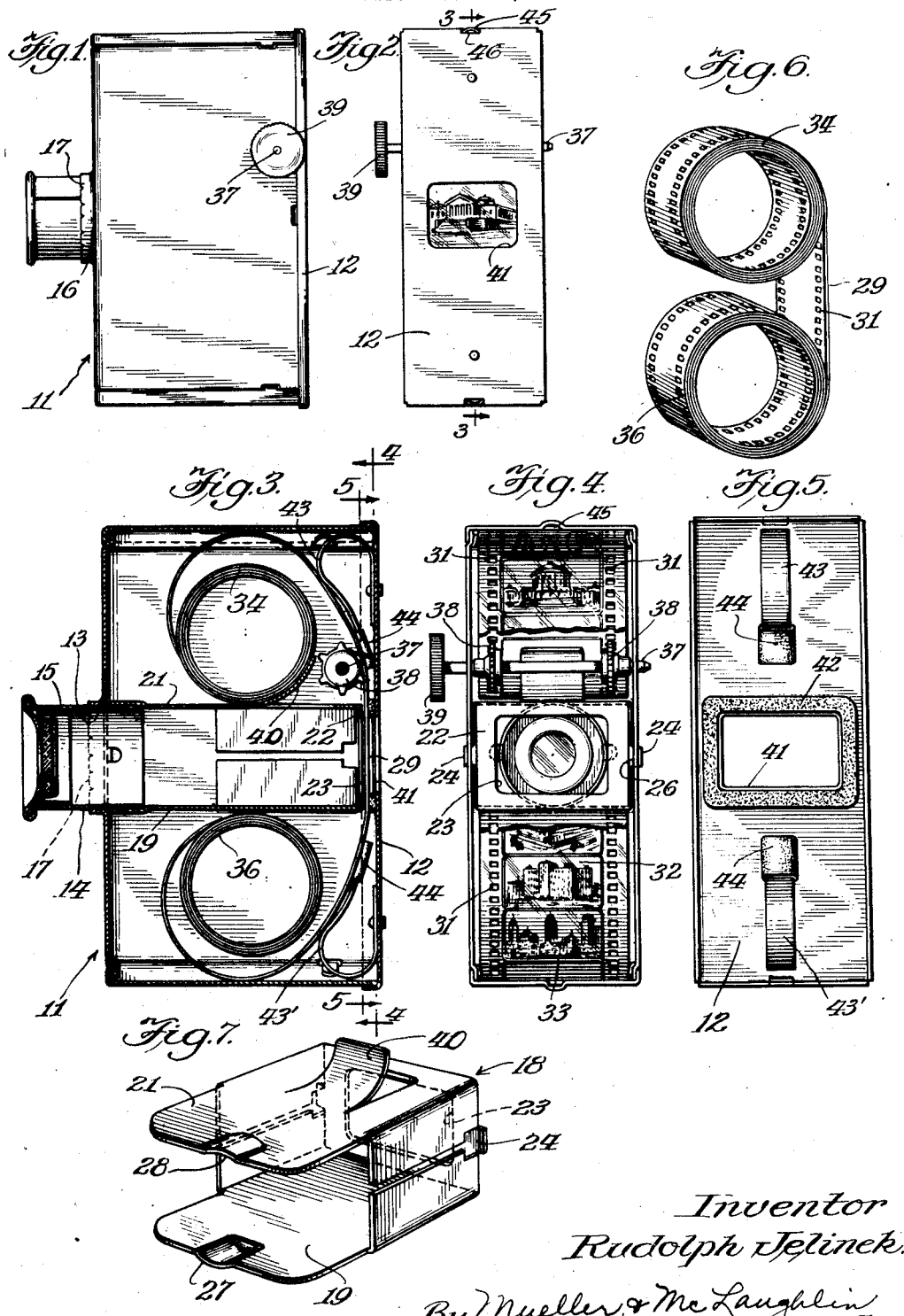
Inventor
Rudolph Jelinek.
By Mueller & McLaughlin
Attys.

Patented July 3, 1934

1,964,879

UNITED STATES PATENT OFFICE 1,964,879

PICTURE DISPLAY DEVICE

Rudolph Jelinek, Chicago, Ill.

Application November 12, 1932, Serial No. 642,350

3 Claims. (Cl. 40—28)

My invention relates in general to picture display apparatus, and in particular to a small hand operated device for displaying individual panoramic views, or similar pictures which are developed on an ordinary picture film or other transparent strip. The present invention is an improvement over, and a simplification of my former devices illustrated in Patent No. 1,752,952 issued April 1, 1930.

It is an object of this invention to provide a small, compact picture film display device, which may be conveniently held in the hand and operated by hand.

A further object is to provide an inexpensive apparatus for displaying a large number of individual pictures, advertising, or the like, appearing on a strip, which apparatus is suitable to be sold as a souvenir or to be given away.

It is also an object to provide a picture display device which in addition to the novelty of displaying pictures to the eye of the operator, will in itself provide an interesting and novel mechanism.

One of the features of my invention is the provision of a machine adapted for displaying pictures on a strip film through a lens directly to the eye of the operator without the expensive mechanism ordinarily required for a similar result.

Other objects and advantages of my invention will be apparent from a further consideration of the description and drawing, in which Fig. 1 is a side elevation of the entire display device, Fig. 2 is a front elevation of the device.

Fig. 3 is a sectional view along line 3—3 of Fig. 2,

Fig. 4 is a view with the front cover removed and taken along the line 4—4 of Fig. 3, Fig. 5 is a view of the inside of the front cover taken on the line 5—5 of Fig. 3, Fig. 6 is a perspective view of the film showing the manner in which it is rolled up in the device, and Fig. 7 is a perspective of the U-shaped film support.

It has always been very popular to provide sets of postal cards, lantern slides or the like, showing views of scenic points of interest, views of important buildings and public works in large cities, and pictures of noted personages. This idea has also been carried into advertising in which a series of displays are provided in the above noted form. Folders of postcards lose their attraction after they have once been observed, and the lantern slides require a large and expensive machine for exhibiting them. In addition, the slides are bulky, difficult to handle, and easily lost or broken. Moving picture projectors for exhibiting pictures of this kind are considerably beyond the price range for this type of novelty.

In practicing my invention I provide a small compact housing having an eyepiece and lens movable in the housing, with the device adapted to be held in one hand and placed with the eye piece, to one eye of the operator. The device is designed for carrying strip film with hand operated mechanism for moving the film in the housing to exhibit pictures on the film through the lens.

Referring now to the drawing, a housing 11 is provided having a removable cover plate 12 and an opening 13 in the rear for accommodating an ordinary movable eyepiece 14, having a lens 15 secured therein. In stamping out the opening 13, an outwardly extending flange 16 is formed and split so as to provide a plurality of resilient fingers 17 around the outer edge. These resilient fingers 17 frictionally engage the eyepiece 14 allowing lateral adjustment but holding it in position once the lens is in proper focus.

The device is divided into upper and lower film carrying compartments by a U-shaped film support 18 mounted centrally of the housing 11. The support comprises a pair of forwardly extending legs 19 and 21 joined by a connecting member 22, having a picture display opening 23 therein. The support 18 is secured in the housing by lugs 24 extending outwardly from member 22, and which fit into corresponding apertures 26 in the side walls of the housing 11. The support is further supported in the rear by the tube portion of the eyepiece 14 with the legs 19 and 21 positioned on opposite sides of the tube and gripping it by means of concave projections 27 and 28 at the rear edges of the legs. As previously explained the eyepiece is slidable in the opening 13, and prevented from being pulled entirely out of the housing by stops 29 on opposite sides of the tube which engage the inner edge of the opening. As a result of the frictional engagement of the fingers 17 and the legs 19 and 21 on the eyepiece it is held in any desired position and at the same time the support 18 with the mounting as described is prevented from rattling.

Pictures are displayed in the apparatus from a strip film 29 containing the spaced perforations 31 along both outer edges. Individual pictures are developed over the length of the film as 32 and 33 and are adapted to be progressively displayed through the eyepiece 14. The film 29, a single strip, is carried in two rolls 34 and 36 formed in the upper and the lower compartments respectively, with the connecting portion lying over the opening 23 in the member 22. A shaft 37 journalled in the housing carries a pair of spur wheels 38 secured to the shaft in a position to correspond to the line of perforations 31 in the film, and adapted to engage the perforations to move the film. The shaft 37 may be rotated by turning the knurled wheel 39 on one end of the shaft. The shaft may be built into either compartment but as illustrated, is mounted in the upper compartment. An upwardly extending projection 40 stamped out of the legs 21 and shaped to conform to the circumference of a circle having a diameter substantially equal to the distance from leg 21 to the top of the housing serves as a guard to prevent the film roll 34 from becoming entangled in the spur wheels 38, and also aids in forming the film into a roll.

The support 18 is of a length such that there is a small space (Fig. 3) between the end of the support and the front plate 12 to allow the film to feed from one compartment to the other. The plate 12 has an opening 41 corresponding to the opening 23, with a felt or paper pad 42 surrounding the opening 41 on the inside of the plate. This serves as a protection for the film as it moves through the machine so that it will not rub against the sharp edges which might be present after stamping out the opening 41. Springs 43 and 43' bent back upon themselves as illustrated in Fig. 3 are secured in any suitable manner to the upper and lower portions of the plate 12. The tip of each spring is covered with felt or rubber 44 to prevent scratching of the film as the springs bear against it, and act to guide the film in or out of the two compartments. The spring 43 also bears against the film to hold it in a position so that the spur wheels 38 will always engage the perforations 31 to move the film. Spring clips 45 stamped adjacent the front edge of the top and bottom fit into corresponding apertures 46 in the cover plate 12 to hold the place on the housing and at the same time making it possible to remove the plate for replacing a roll of film.

In operating the device a roll of film 29 is inserted behind the guard 40 in the upper compartment and the end of the film pulled down across the opening 23. One or two turns is made with the end of the film to form a small roll 36 which is inserted in the lower compartment. The front cover plate 12 is then snapped in position with the springs 43 and 43' bearing against the film, and the opening 41 in alignment with opening 23. While holding the device in one hand with the eyepiece 14 up to one eye of the operator, the wheel 39 may be turned with the other hand thus rotating the shaft 37. It is more satisfying to face a source of light so that it will shine through the openings 23 and 41, and show up the picture at the eyepiece to better advantage. As the spur wheels 38 engage the perforations 31, the film is moved past these openings to display the individual pictures to the eye of the operator. With the limited distance between the two rolls 34 and 36 of film they will form without a roller to which the ends are ordinarily attached under similar circumstances, and with these rolls confined within their respective compartments the film is readily fed from one to the other. Thus a very simple and inexpensive display apparatus is provided which may be sold as a toy, as a souvenir, or given away for advertising purposes wherein the advertising matter is shown on the film.

In addition to displaying pictures in a very satisfactory manner, the operation of the device is novel and interesting to provide an attraction for the operator. Other films may be substituted so that the device is capable of long and extended use.

It will be understood that the nature and embodiment of the invention herein described and illustrated is merely a convenient and useful form of the invention, and that many changes may be made therein without departing from the spirit and scope of the appended claims.

What I claim is new and desire to protect by Letters Patent of the United States, is:

1. In a device of the class described, a housing, a U-shaped film support mounted centrally of the housing to divide the latter into upper and lower film carrying compartments, said support comprising a pair of forwardly extending members having a connecting member therebetween with an opening in said connecting member lying in the line of vision through the eyepiece, a picture film strip having perforations therein and having a rolled portion lying freely in each compartment adapted to be fed from one compartment to the other past the opening in the connecting member, a rotatable shaft journalled in the housing adjacent one compartment and having a spur wheel secured thereto for engaging the perforations in the film to move the same upon rotation of the shaft, and a cover plate for said housing having a view opening therein corresponding with the opening in the film support.

2. In a picture display device, a housing, an eyepiece having a lens therein carried by the housing, a film support mounted centrally of the housing to divide the latter into a pair of film carrying compartments, an opening in said support lying in the line of vision through the eyepiece, a picture film strip having perforations therein adapted to be fed from one compartment to the other past the opening in the support, a rotatable shaft journalled in the housing having spur wheels thereon for engaging the perforations to move the film upon rotation of the shaft, and a cover plate for said housing having spring members thereon adapted to bear against the film to hold the film in operative relation with the spur wheels.

3. In a device as described in claim 2 in which the springs on the cover plate for said housing are curved to conform to the shape of the film being fed from one compartment to the other, with said spring members adapted to assist in the feeding movement of the film, said plate having an opening centrally of the plate in alignment with the opening in the bracket whereby light is admitted to the housing to illuminate the pictures on the film as it is being moved past said openings.

RUDOLPH JELINEK.